(12) United States Patent
Takeda (10) Patent No.: US 10,495,131 B2
(45) Date of Patent: Dec. 3, 2019

(54) BLIND NUT, A BLIND NUT ASSEMBLY AND MOUNTING STRUCTURE THEREOF

(71) Applicant: NEWFREY LLC, New Britain, CT (US)

(72) Inventor: Atsushi Takeda, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 313 days.

(21) Appl. No.: 15/654,958

(22) Filed: Jul. 20, 2017

(65) Prior Publication Data

US 2018/0023612 A1    Jan. 25, 2018

(30) Foreign Application Priority Data

Jul. 20, 2016    (JP) .................. 2016-142074

(51) Int. Cl.
| | |
|---|---|
| *F16B 37/04* | (2006.01) |
| *F16B 39/08* | (2006.01) |
| *F16B 39/10* | (2006.01) |
| *F16B 39/12* | (2006.01) |
| *F16B 39/26* | (2006.01) |

(52) U.S. Cl.
CPC ............ *F16B 37/042* (2013.01); *F16B 39/08* (2013.01); *F16B 39/10* (2013.01); *F16B 39/124* (2013.01); *F16B 39/26* (2013.01)

(58) Field of Classification Search
CPC ....... F16B 37/062; F16B 37/065; F16B 37/06
USPC ................... 411/183, 14.5, 27, 34, 80.6, 432
See application file for complete search history.

(56) References Cited

U.S. PATENT DOCUMENTS

| | | | | | |
|---|---|---|---|---|---|
| 3,085,463 | A | * | 4/1963 | Hallock .............. | F16B 19/1072 411/34 |
| 3,316,796 | A | * | 5/1967 | Young .................. | F16B 13/002 411/29 |
| 4,269,106 | A | * | 5/1981 | Leibhard .............. | F16B 13/061 411/34 |
| 4,752,168 | A | * | 6/1988 | Richter ................ | F16B 13/061 411/38 |
| 5,006,025 | A | * | 4/1991 | Duran .................. | F16B 5/0208 411/108 |
| 5,509,765 | A | * | 4/1996 | Albin .................... | F16B 13/061 411/344 |
| 5,664,901 | A | * | 9/1997 | Mayr .................... | F16B 13/126 403/282 |

(Continued)

*Primary Examiner* — Gary W Estremsky
(74) *Attorney, Agent, or Firm* — Kofi A. Schulterbrandt; Michael P. Leary (57) ABSTRACT

A blind nut assembly including a bush and nut. The bush includes a short cylindrical collar, which has a polygonal outer surface on the outer surface thereof, and a flange, the outer surface of which is polygonal. The nut consists of a female screw member, on which a female screw to be mated with a male screw on a bolt is formed; and a nut cylindrical member, which is formed adjacent to the female screw member, which has a polygonal inner surface on the inner surface thereof aligning with the polygonal outer surface of the collar, of which the outer surface is also a polygonal outer surface, and which has a wall thickness that is thinner than the female screw member. The nut head has an outer diameter which is larger than the maximum outer diameter of the nut cylindrical member, is formed above the nut cylindrical member.

15 Claims, 9 Drawing Sheets

(56) References Cited

U.S. PATENT DOCUMENTS

| | | | | |
|---|---|---|---|---|
| 6,932,044 B1* | 8/2005 | Fenech | ............... | F01M 11/0004 |
| | | | | 123/195 C |
| 7,226,263 B2* | 6/2007 | Schwarzbich | ........ | F16B 5/0233 |
| | | | | 403/374.3 |
| 7,841,816 B2* | 11/2010 | Jodeleit | ............. | B29C 45/14336 |
| | | | | 411/34 |
| 8,066,465 B2* | 11/2011 | Figge | ....................... | F16B 5/025 |
| | | | | 411/34 |
| 8,262,329 B2* | 9/2012 | Wille | ................. | F16B 19/1072 |
| | | | | 411/34 |
| 8,827,585 B2* | 9/2014 | Figge | ................... | B62D 25/147 |
| | | | | 403/168 |

\* cited by examiner

BLIND NUT, A BLIND NUT ASSEMBLY AND MOUNTING STRUCTURE THEREOF

CROSS-REFERENCE TO RELATED APPLICATIONS

This application claims priority, under 35 U.S.C. § 119 (a)-(d), to JP Patent Application No. 2016-142074 filed Jul. 20, 2016, the contents of which are incorporated herein by reference in its entirety.

FIELD OF THE INVENTION

The present invention relates to a blind nut and a mounting structure thereof, and in particular to a blind nut which can be mounted or removed in one step, as well as a mounting structure thereof which is mounted by such a blind but as stated above.

BACKGROUND OF THE INVENTION

A blind nut consists of a female screw member with female screws formed on the inner surface thereof, a hollow tubular member adjacent to the female screw member, and a flange provided with an opening on one edge of the tubular member. The tubular member of the blind nut is inserted through the mounting hole of the mounted member to cause the flange in contact with the surface of the mounted member; in this state, plastic deformation is performed by utilizing a tightening tool so as to enlarge the diameter of the tubular member, and the mounted member is caused to be sandwiched between the deformed tubular member and the flange. In this manner, the blind nut is fixated onto the mounted member. The male screw provided on a bolt is caused to be engaged with the female screw on the blind nut, which has been fixated onto the mounted member. Then another mounting member can be mounted. When the blind nut is utilized, one side of the mounted member is worked on. Therefore, the blind nut can be utilized to tighten a mounting member such as decorative items and the like onto a member of which the rear side is not accessible (for example, a mounted member such as a panel, and the like).

Generally, when a mounted member is mounted by utilizing a blind nut, the blind nut is caulked to the mounted member, by utilizing a dedicated tool, on the side (blind side) opposite from the insertion side; and then the mounting member is bolted on the insertion side (working side) with a bolt. In order to tighten a mounted member by utilizing a blind nut, two steps have been needed.

Patent Literature 1 relates to such a blind nut as stated above and discloses a caulking nut (blind nut) which comprises a primary nut and a secondary nut. The primary nut is constituted in a manner so that a thick walled-opening member is formed on the upper end of the thin cylindrical member having an inner hole. The thick walled-opening member has a male screw on the outer periphery thereof and has a hole of which the inner diameter is smaller than the inner hole of the thin cylindrical member. On the lower end of the thin cylindrical member, a female screw of which the inner shape is smaller than the inner hole thereof is formed. The secondary nut has a female screw which is capable of being engaged with the male screw provided on the thick walled-opening member, and it is constituted to take a polygonal shape.

In order to mount the caulking nut, the caulking nut is inserted into the mounting hole of the plate (mounted member), with the female screw provided on the secondary nut engaged with the male screw provided on one end of the primary nut. When the screw of the caulking tool is caused to be engaged with the female screw provided on the lower end of the primary nut and pulled into the upper direction, the cylindrical member of the primary nut is bended to the outer side of the radius direction to form a protrusion (expanded radius member), which causes the plate to be sandwiched between the secondary nut and the protrusion of the primary nut. After the caulking tool is removed, a bolt is caused to pass through the mounting hole of the mounting member to be engaged with the female screw of the primary nut. Then, the mounting member such as a frame and the like can be mounted.

When not in use, the secondary nut is loosened to remove it from the primary nut; and the primary nut is pulled out through the mounting hole on the plate. Thus, the caulking nut can be removed.

In utilizing the blind nut stated in Patent Literature 1, the blind nut is caulked by utilizing the caulking tool onto the mounted member on the side opposite from the insertion side, and then the mounting member on the insertion side is screwed by utilizing a bolt. Therefore, the operations need to be conducted in these 2 steps.

Another blind rivet is available which can be mounted in one step by utilizing commercially-available drills and tools. In this blind rivet, the flange is constituted as a separate body, and thus the blind rivet can be removed after it is mounted. However, when the flange is constituted as a separate body from the blind rivet, the strength in the circumferential direction of the enlarged diameter member to be buckled decreases, which may deform the enlarged diameter member into an abnormally deformed shape due to the stress resulting from tightening the screw.

Patent Literature 2 relates to such a blind rivet as stated above and discloses a caulking nut (blind nut) which can be removed after it is mounted; it comprises a primary nut and a washer. On the primary nut, a mouth member having an uneven outer periphery is formed at the upper end of a cylindrical member having a thin inner hole. On the lower end of the cylindrical member, the mouth member has a mating hole which can be mated with the mouth member and has an irregular shape; the outer periphery thereof is constituted into a hexagonal shape.

In order to mount the caulking nut, the caulking nut is inserted into the mounting hole on the plate, with the washer mated with the mouth member provided on the primary nut. A tightening bolt is inserted into the inner hole of the primary nut from the upper direction; the rotary shaft of the caulking tool is mated with the recess of the tightening bolt; and the detent is caused to be engaged with the outer periphery of the hexagonal washer to prevent the washer from rotating around. Thereafter, when the rotating shaft of the caulking tool is rotated to cause the tightening bolt to be screwed into the female screw member and mounted, the cylindrical member of the primary nut is bent in the outward radial direction to form a bulging member, which causes the plate to be clamped between the washer and the bulging member of the primary nut.

When not in use, the tightening bolt is caused to be reversely rotated to remove [the caulking nut] from the primary nut, with the washer retained by the detent to prevent the washer from rotating around. Subsequently, when the washer is pulled out of the upper end of the primary nut, the primary nut can be removed from the plate.

The caulking nut disclosed in Patent Literature 2 is capable of fastening two plates in one bolt-tightening step through the use of the caulking tool by forming a protruding member. Moreover, when the tightening bolt is reversely rotated, and the washer is removed, the caulking nut can be removed. However, when the tightening bolt is mounted to buckle the cylindrical member, force in the circumferential direction is applied to the cylindrical member about the center axis thereof. Meanwhile, in the caulking nut of Patent Literature 2, the washer is constituted as a separate member so as to be removable, the strength against the force in the circumferential direction is decreased. When the tightening bolt is rotated to buckle the cylindrical member, the cylindrical member may be abnormally deformed in a twisted manner. Wherefore, the thickness of the upper portion of the cylindrical member has had to be thick.

Therefore, a blind nut which can be mounted in one step simply by utilizing commercially-available rotating tools such as an electric drill and the like, of which the expanded diameter member is not abnormally deformed, and which can be securely fastened and can be removed after fastening, has been in demand. Registered Utility Model No.: 3121304 and Japanese Unexamined Patent Application Publication No.: 2008-175379 may inform the context of this disclosure.

BRIEF SUMMARY OF THE INVENTION

Therefore, the object of the present invention is to provide a blind nut which can be mounted in one step simply by utilizing commercially-available rotating tools, such as an electric drill, and the like, which can be removed, and of which the expanded diameter member is not abnormally deformed.

In order to achieve this object, the blind nut of the present invention comprises a bush consisting of a cylindrical collar, which has a polygonal shape on the outer surface thereof, and a flange, which has a polygonal shape on the outer surface; and a nut consisting of a female screw member and a nut cylindrical member, of which the thickness is thinner. The nut cylindrical member is supported by the collar of the bush from the inside thereof, and the nut cylindrical member appropriately expands to form an expanded diameter member.

A first embodiment of the present invention is as follows:

Blind nut, comprising a bush consisting of a short cylindrical collar, which has a polygonal outer surface on the outer surface thereof, and a flange, which is formed on one end of the collar; and a nut body consisting of a cylindrical female screw member, on which a female screw to be mated with a male screw on a bolt is formed; and a nut cylindrical member, which is formed adjacent to the female screw member, which is a polygonal inner surface on the inner surface thereof aligning with the polygonal outer surface of the collar, and which has a wall thickness that is thinner than the female screw member.

When the collar of the bush has the polygonal outer surface thereof, and when the nut cylindrical member of the nut has the polygonal inner surface thereof which aligns the polygonal outer surface, the collar of the bush is inserted into the inside of the nut cylindrical member of the nut so that the collar supports the nut cylindrical member from the inside, and the nut and the bush can be retained so as not to be mutually rotated.

It is desirable that, on the central portion of the bolt head of the bolt, a bolt head hole of which the cross-sectional surface is polygonal be formed. It is desirable that the cross-sectional surface be hexagonal. If the bolt head hole having the polygonal cross-sectional surface is formed, it becomes possible to insert a tool into the bolt head hole to rotate the bolt. It is desirable that, on the flange of the bush, a flange concave member for accommodating the bolt head be formed. If the flange concave member is formed on the flange, it becomes possible to accommodate the bolt head.

It is desirable that a nut head having an outer diameter larger than the outer diameter of the nut cylindrical member be formed on one end of the nut cylindrical member.

If the thick nut head is formed on one end of the nut cylindrical member, when the bolt is screwed in to buckle the nut cylindrical member, it becomes possible to prevent nut cylindrical member from being deformed in a twisted manner in the circumferential direction.

The outer surface of the flange of the bush is desirably polygonal. If the outer surface of the flange of the bush is polygonal, it becomes possible to provide support to it so that it is not rotated by tools, such as a wrench, and the like.

It is desirable that the upper surface and the lower surface of the flange of the bush be inclined downward from the central portion to the periphery. If the upper surface and the lower surface of the flange of the bush are inclined downward from the central portion to the periphery, when the blind nut is mounted onto the mounted member, the flange bends, and this creates stable axial force, which retains the mounted member.

It is desirable that the outer surface of the nut cylindrical member be a polygonal outer surface having the same number of polygonal corners as the polygonal inner surface of the nut cylindrical member; the thickness of the nut cylindrical member is desirably constant in the circumferential direction. If the thickness of the nut cylindrical member is constant, when the nut cylindrical member is buckled to be mounted, the nut cylindrical member becomes capable of expanding evenly.

It is desirable that the polygonal outer surface of the collar and the polygonal inner surface of the nut be hexagonal.

The bush is preferably formed with a material that is harder than the nut. If the bush is preferably formed with a material that is harder than the nut, when the nut cylindrical member of the nut is buckled, the bush is not deformed, which makes it possible for the bush to support the nut cylindrical member from the inside thereof in a firmer manner.

A second embodiment of the present invention is as follows:

Blind nut assembly which is an assembly of the bush, nut, and bolt of the blind nut, wherein the lower surface of the bolt head member of the bolt is in contact with the upper surface of the flange of the bush, the lower surface of the flange of the bush is in contact with the upper surface of the bolt head member of the bolt, the polygonal outer surface of the collar of the bush aligns with the polygonal inner surface of the nut cylindrical member of the nut, the collar of the bush is accommodated within the nut so as not to be rotated, and the male screw of the bolt is engaged with the female screw of the nut.

In the case where the polygonal outer surface of the bush and the polygonal inner surface of the nut cylindrical member of the nut are aligned, and where the collar of the bush is accommodated in a portion of the inside of the nut cylindrical member of the nut so as not to be rotated, when the nut cylindrical member is buckled, it is not deformed inwardly, and it is not twisted in the circumferential direction; instead, the nut cylindrical member is supported from the inside thereof so that it is deformed outwardly to form the expanded diameter member. When the male screw of the bolt is engaged with the female screw of the nut, it becomes possible for the members of the blind nut assembly to be retained so as not to fall off. In this way, the blind nut assembly can be inserted into the mounting hole of the mounted member, and easily mounted.

A third embodiment of the present invention is as follows:

Mounting structure for tightening the mounted member and the mounting member by means of the blind nut assembly, wherein the collar of the bush and a portion of the nut cylindrical member of the nut are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the flange of the bush and the expanded diameter member where the nut cylindrical member of the nut is expanded.

If the part of nut cylindrical member is deformed outwardly to form the expanded diameter member, the expanded diameter member has a strength level at which it capable of securely tightening the mounted member and the mounting member.

A fourth embodiment of the present invention is as follows:

Blind nut comprising:

a bush having a short cylindrical collar, which has a polygonal outer surface on the outer surface thereof, and a nut body;

wherein the nut body has a female screw member, on which a female screw to be mated with a male screw of the axial member of a bolt is formed, and a nut cylindrical member, which is formed adjacent to the female screw member, has a polygonal inner surface on the inner surface thereof aligning with the polygonal outer surface of the collar, the outer surface of which is a polygonal outer surface having the same number of polygonal corners as the polygonal inner surface, and a wall thickness that is thinner than the female screw member.

If the bush takes a short cylindrical shape, consists of the collar having the polygonal outer surface and has no flange, the shape of the bush is simple, and thus such bush as the above can be manufactured at low cost.

The cross-sectional surface of the bolt head of the bolt is desirably hexagonal. If the cross-sectional surface of the bolt head is hexagonal, it becomes possible to rotate the bolt with ease by utilizing tools such as a wrench.

The collar is desirably formed with a material harder than the nut. If the collar is formed with a material harder than the nut, when the nut cylindrical member of the nut buckles to form the expanded diameter member, the collar is not deformed, and it is capable of firmly supporting the nut cylindrical member from the inside thereof.

A fifth embodiment of the present invention is as follows:

Blind nut assembly which is an assembly of the bush, nut and bolt of the blind nut, wherein the polygonal outer surface of the collar aligns with the polygonal inner surface of the nut cylindrical member of the nut body, the collar is accommodated within the nut so as not to be rotated, the lower surface of the bolt head of the bolt is in contact with the upper surface of the nut cylindrical member of the nut body, and the male screw of the bolt is mated with the female screw of the nut.

A sixth embodiment of the present invention is as follows:

Mounting structure for tightening the mounted member and the mounting member by means of the blind nut assembly, wherein the collar of the bush and a portion of the nut cylindrical member of the nut are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the bolt head of the bolt and the expanded diameter member where the nut cylindrical member of the nut is expanded.

A seventh embodiment of the present invention is as follows:

Blind nut assembly which is an assembly of the bush, nut, bolt, and washer of the blind nut, wherein the polygonal outer surface of the collar aligns with the polygonal inner surface of the nut cylindrical member of the nut body, the collar is accommodated within the nut so as not to be rotated, the lower surface of the bolt head of the bolt is in contact with the upper surface of the washer, the lower surface of washer is in contact with the upper surface of the nut cylindrical member of the nut body, and the male screw of the bolt is mated with the female screw of the nut body.

It is desirable that the utilized washer have an inner diameter that is larger than the axial member of the bolt, and an outer diameter that is larger than the nut head of the nut. If the washer utilized has an inner diameter that is larger than the axial member of the bolt and an outer diameter that is larger than the nut head of the nut, it becomes possible to screw in the bolt in a smooth manner.

An eighth embodiment of the present invention is as follows:

Mounting structure for tightening the mounted member and the mounting member by means of the blind nut assembly, wherein the collar and a portion of the nut cylindrical member of the nut are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the washer and the expanded diameter member where the nut cylindrical member of the nut is expanded.

It is desirable that the mounting hole of the mounted member be polygonal, having the same number of polygonal corners as the polygonal outer surface of the collar and the polygonal inner surface of the nut cylindrical member. If the mounting hole of the mounted member is polygonal, having the same number of polygonal corners as the polygonal outer surface of the collar and the polygonal inner surface of the nut cylindrical member, when the blind nut is mounted, it becomes possible to support the nut cylindrical member so as not to be rotated, which makes it unnecessary to retain the bush so as not to be rotated.

It is desirable that the polygonal outer surface of the collar, the polygonal inner surface of the nut cylindrical member, and the mounting hole of the mounted member be square. If the polygonal outer surface of the collar, the polygonal inner surface of the nut cylindrical member, and the mounting hole of the mounted member are square, the effects of preventing the rotations are well exhibited.

According to the present invention, it has become possible to obtain a blind nut which can be mounted/removed in one step simply by utilizing commercially-available rotating tools such as an electric drill, and the like, the expanded diameter member of which is not abnormally deformed.

DETAILED DESCRIPTION OF THE INVENTION

First Embodiment

Figure 1:
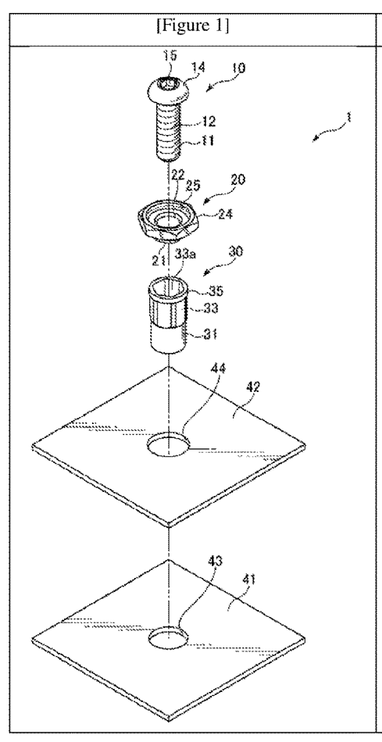
FIG. 1 is an exploded perspective view of a blind nut according to a first embodiment of the present invention.

Hereinafter, the blind nut 1 according to the first embodiment of the present invention shall be described with reference to the drawings. FIG. 1 is an exploded perspective view of a blind nut 1, a bolt 10, a mounted member 41, and a mounting member 42 according to the first embodiment. FIG. 1 is an exploded perspective view of a blind nut 1, a bolt 10, a mounted member 41 and a mounting member 42 according to the first embodiment. The blind nut 1 is provided with a bush 20 and a nut body 30. The bolt 10 has a shaft member 11 having a male screw 12 and a bolt head member 14 on the upper portion thereof. A bolt head hole 15 having a hexagonal cross section is formed in the bolt head member 14; a bolt head hole 15 of a hexagonal cross section shape is formed on the bolt head member 14, so that the bolt can be rotated by a tool such as a commercially-available hexagonal wrench.

The bush 20 has a short tubular collar 21 and an upper flange 24 thereof. The nut body 30 has a female screw member 31 and a nut cylindrical member 33; a nut head member 35 is formed on the upper portion of the nut cylindrical member 33. An attachment hole 43 having a circular cross section is formed on the mounted member 41. A mounting hole 44 having a circular cross section is formed in the mounting member 42.

The collar 21 of the bush 20 is inserted into the nut cylindrical member 33 of the nut body 30, the shaft member 11 of the bolt 10 is inserted into therein, the male screw 12 of the bolt 10 is screwably mounted into the female screw 32 of the female screw member 31 of the nut body 30 to form a blind nut assembly 1a.

Next, the blind nut assembly 1a is inserted into the attachment holes 43, 44 of the mounted member 41 and the mounting member 42; when the male screw 12 of the bolt 10 is further screwed into the female screw 32 of the nut body 30, the nut cylindrical member 33 buckles to form an enlarged diameter member 33d, and between the flange 24 and the enlarged diameter member 33d, the mounted member 41 and the mounting member 42 are fastened.

Figure 2:
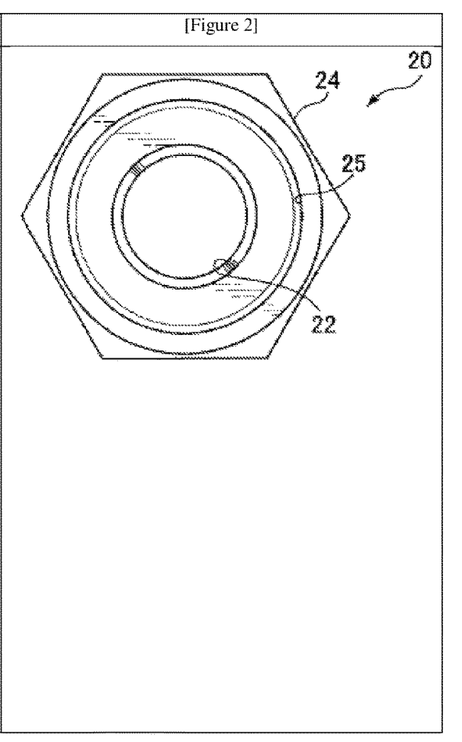
FIG. 2 is a top view of the bush of the blind nut of FIG. 1.
Figure 3:
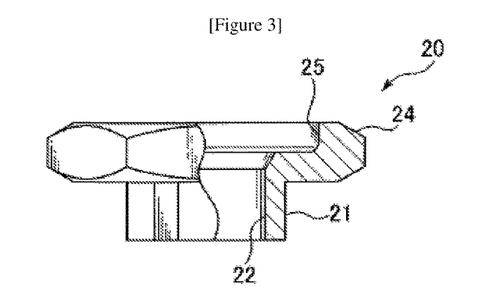
FIG. 3 is a front view showing a portion of the bush of FIG. 2 as a cross section.
Figure 4:
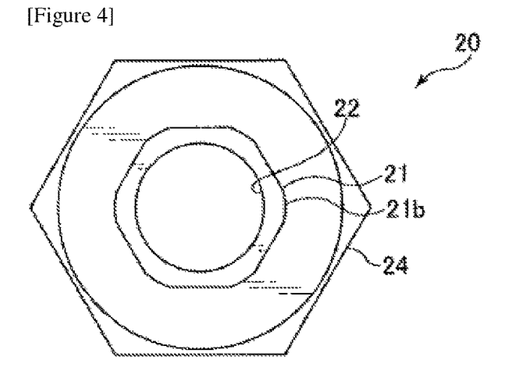
FIG. 4 is a bottom view of the bush of FIG. 2.
Figure 5:
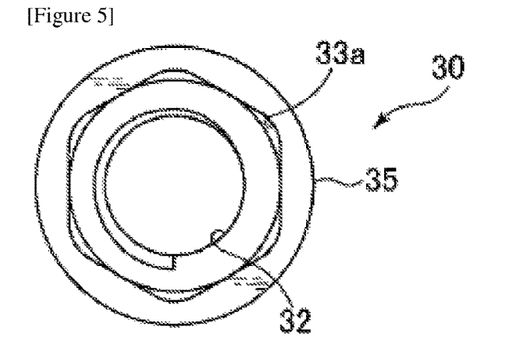
FIG. 5 is a top view of the nut body of the blind nut of FIG. 1.
Figure 6:
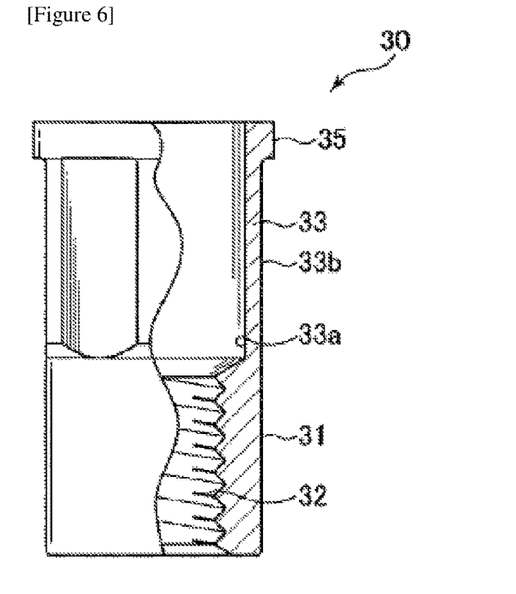
FIG. 6 is a front view showing a portion of the nut body of FIG. 5 as a cross section.
Figure 7:
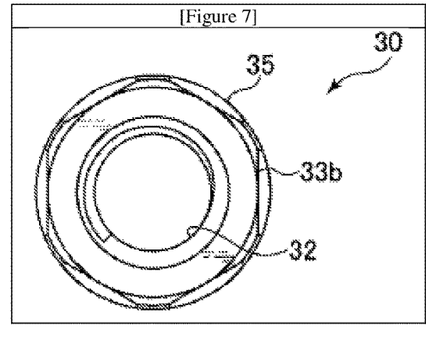
FIG. 7 is a bottom view of the nut body of FIG. 5.
Figure 8:
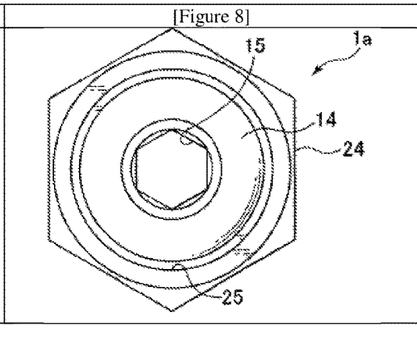
FIG. 8 is a top view of a plain nut assembly with blind nut members assembled of FIG. 1.
Figure 9:
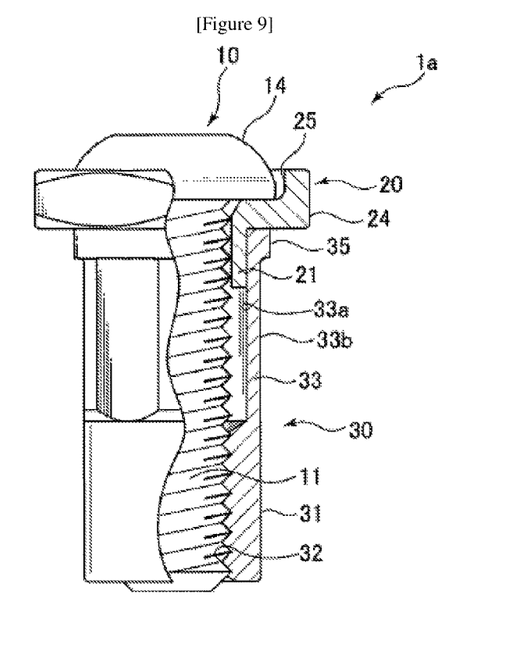
FIG. 9 is a front view showing a portion of the blind nut assembly of FIG. 8 as a cross section.
Figure 10:
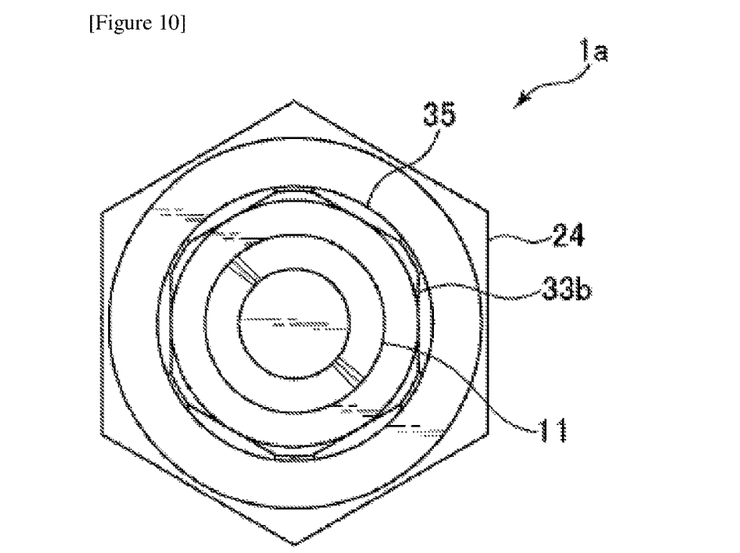
FIG. 10 is a bottom view of the blind nut assembly of FIG. 8.
Figure 11:
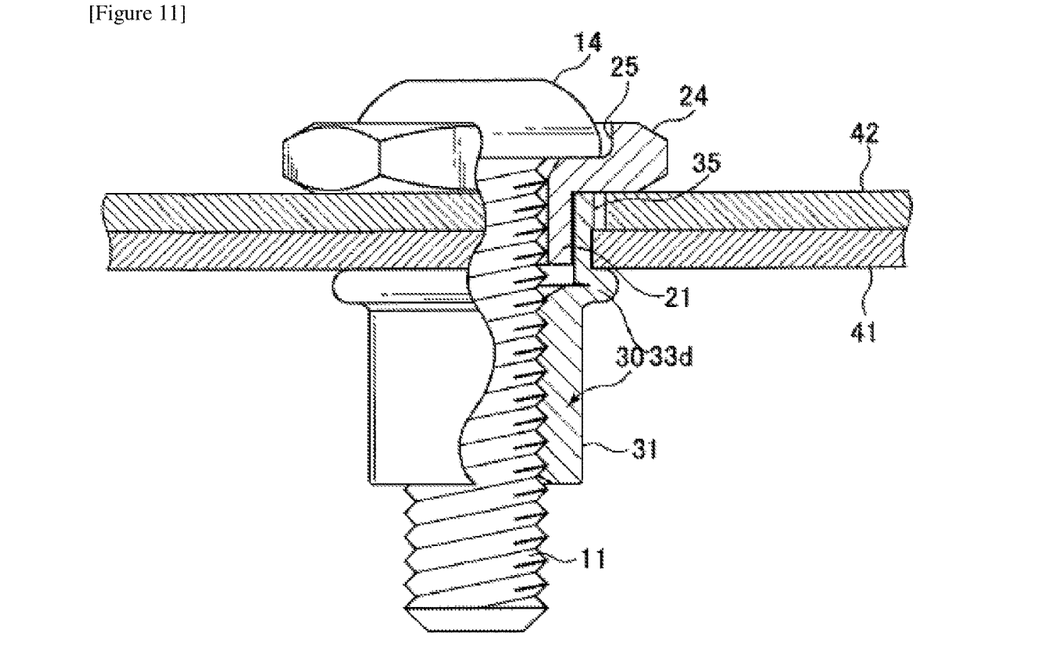
FIG. 11 is a front view showing a portion of the state where the mounted member and the mounting member are fastened by the blind nut assembly of FIG. 8 as a cross section.
Figure 12:
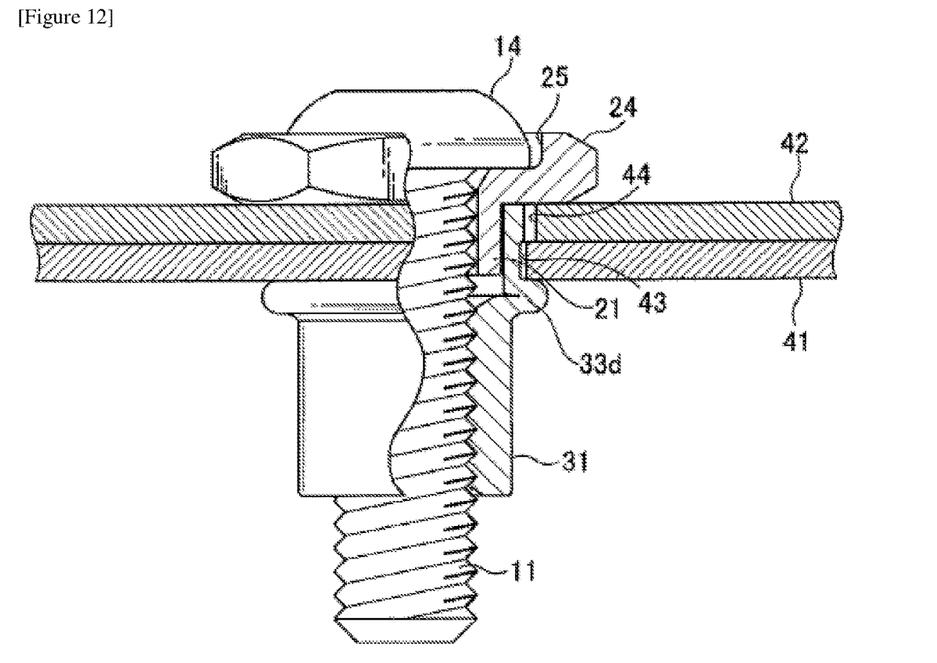
FIG. 12 is a front view showing a portion of the state wherein the mounted member and the mounting member are fastened by the blind nut assembly of FIG. 8 as a cross section.

Each member of the blind nut 1 will now be described in detail. FIGS. 2-4 show the bush 20, and FIGS. 5-7 show the nut body 30. FIGS. 8-10 show the blind nut assembly 1a in which the bolt 10, the bush 20 and the nut body 30 are combined. FIGS. 11 and 12 are cross sectional views of the blind nut body 1a in a state where the mounted member 41 and the mounting member 42 are fastened. In the description of the present specification, the description will be done with the upper direction of FIG. 1 as the top.

The bolt 10 is a commercially-available product and will now be described with reference to the exploded perspective view of FIG. 1. The bolt 10 is formed of a rigid material that is hard to deform, and has a shaft member 11 having a male screw 12 of an elongated columnar shape, and a bolt head member 14 of a diameter larger than that of the shaft member 11 on the upper portion.

An outer peripheral portion of the bolt head member 14 is circular, and a bolt head hole 15 of a hexagonal cross section shape is formed in the upper central portion of the bolt head member 14. A tip portion of a commercially-available tool such as a hexagonal wrench wherein the cross section is of a hexagonal shape is inserted into the bolt head hole 15 so that the bolt 10 can be rotated. Alternatively, a hexagonal outer peripheral portion may be formed on the bolt head member 14, and this portion may be rotated by a wrench, or the like.

With reference to FIGS. 2-4, the bush 20 of the blind nut 1 will now be described. FIG. 2 is a top view of the bush 20, FIG. 3 is a front view in which a portion is rendered as a cross section, and FIG. 4 is a bottom view. The bush 20 is a member for reinforcing the nut body 30 from the inside when a later-described nut body 30 buckles, and is made of a material harder than the nut body 30. The bush 20 is axially symmetrical about the central axis as a whole.

The bush 20 has a collar 21 with a short tube at one end and a flange 24 at the other end. The collar outer surface 21b of the collar 21 is a polygonal outer surface having a substantially hexagonal cross section, and the vertex is chamfered. A collar hole 22 of a circular cross section shape is formed along the central axis of the collar 21.

The distance between the two opposing outer surfaces of the flange 24 is greater than the distance (maximum diameter) between the apexes of the collar 21. The cross section of the outer surfaces of the flange 24 is hexagonal and can be supported so as not to rotate with a tool, such as a spanner. On the upper surface of the flange 24, a flange recessed member 25 having a circular cross section shape is formed. The flange recess 25 is shallow, and the bottom face is flat. The inner diameter of the flange recessed member 25 is slightly larger than the outer diameter of the bolt head 14 of the bolt 10 so that the bolt head 14 can be accommodated. The central portion of the flange recessed member 25 is continuous with the lower collar hole 22.

With reference to FIGS. 5-7, the nut body 30 of the blind nut 1 will now be described. FIG. 5 is a top view of the nut body 30, FIG. 6 is a front view in which a part is taken as a cross section, and FIG. 7 is a bottom view.

The nut body 30 is a part that buckles to form a diameter-enlarged portion, and is made of a plastically deformable material such as mild steel, aluminum, or the like. The nut body 30 is axially symmetric around the central axis as a whole.

The nut body 30 has a cylindrical female screw member 31 and a nut cylindrical member connected to the upper side of the female screw member 31; a nut head member 35 is formed on the upper side of the nut cylindrical portion 33.

The internally screwed portion 31 is of a cylindrical shape, and a female screw 32 is formed on the inner surface. The female screw 32 can be screwed into the male screw 12 of the bolt 10.

A nut cylindrical member 33 is formed on the upper side of the female screw member 31. The nut outer surface 33b of the nut cylindrical member 33 is a polygonal outer surface having a substantially hexagonal cross section shape, and the corner portion is chamfered. The nut cylindrical member 33 is a portion that buckles and expands in diameter, and the wall thickness of the nut cylindrical member 33 is thinner than the wall thickness of the female screw member 31 to facilitate buckling.

The nut inner surface 33a of the nut cylindrical member 33 is a polygonal inner surface which is larger than the inner diameter of the female screw member 31 and whose cross section is substantially hexagonal; the corner portion thereof is chamfered. The nut inner surface 33a is matched with the collar outer surface 21b of the bush 20. The wall thickness of the nut cylindrical member 33 is substantially uniform in the circumferential direction and can be buckled uniformly.

The distance between the opposing nut inner surfaces 33a is equal to or slightly larger than the distance between the opposing collar outer surfaces 22b of the collar 21, and the collar 21 of the bush 20 can be inserted into the nut cylindrical member 33. The lower surface of the flange 24 abuts against the upper surface of the nut head member 35 of the nut body 30, so that the bush 20 and the nut body 30 are held so as not to rotate relative to each other.

On the upper side of the nut cylindrical member 33, a short nut head member 35 is formed. The cross section of the inner surface of the nut head member 35 is the same as that of the nut cylindrical member 33 and is a polygonal inner surface having a substantially hexagonal shape. The cross section of the outer surface of the nut head 35 is circular, and the outer diameter is substantially equal to or slightly larger than the distance (maximum outer diameter) between the apexes of the hexagon of the nut cylindrical member 33.

The thickness of the nut head member 35 is thicker than the thickness of the nut cylindrical member 33. When the nut cylindrical member 33 buckles and expands its diameter, the nut head member 35 at the distal end portion is not deformed.

The length of the collar 21 of the bush 20 is longer than the length of the nut head 35. Also, it may be short. In a state wherein the collar 21 of the bush 20 is inserted into the nut head 35 and the nut cylinder 33 of the nut body 30, the collar 21 protects the nut head 35 and the upper portion of the nut cylindrical member 33 from the inside.

Again referring to FIG. 1, a mounting hole 43 having a circular cross section is formed in the mounted member 41. A mounting hole 44 having a circular cross section is formed in the mounting member 42. In this specification, the plate material on the opposite side (blind side) from the side where the blind nut is inserted is referred to as a mounted member 41, and the plate material on the side of insertion (work side) is referred to as a mounting member 42.

The inner diameter of the mounting hole 44 of the mounting member 42 is slightly larger than the outer diameter of the nut head member 35. The axial length of the nut head 35 is substantially equal to the plate thickness of the mounting member 42. The inner diameter of the mounted hole 43 of the mounted member 41 is slightly larger than the outer diameter of the nut cylindrical member 33, and slightly larger or slightly smaller than the outer diameter of the nut head member 35.

The outer diameter of the flange 24 of the bush 20 is larger than the inner diameter of the mounting hole 44 of the mounting member 42. Although the mounting hole 43 of the mounted member 41 has a circular cross section, the mounting hole 43 may have a substantially hexagonal shape according to the outer shape of the nut cylindrical member of the nut body 30. Even the mounting hole 44 of the mounting member 42 can be formed into a substantially hexagonal shape.

With reference to FIGS. 8-10, a blind nut assembly 1a wherein the bolt 10, the bush 20 and the nut body 30 are combined will now be described. FIG. 8 is a top view of the blind nut assembly 1a, FIG. 9 is a front view in which a part is rendered as a cross section, and FIG. 10 is a bottom view.

To assemble the blind nut assembly 1a, the hexagonal direction around the center axis of the collar 21 of the bush 20 is matched with the hexagonal direction around the central axis of the nut cylindrical member 33 of the nut body 30. When the collar 21 of the bush 20 is inserted from the side of the nut head 35 of the nut body 30, the lower surface of the flange 24 of the bush 20 abuts the upper surface of the nut head 35 and stops. In this state, the nut body 30 and the bush 20 are held so as not to rotate relative to each other.

Next, the bolt 10 is inserted into the collar 21 from the flange 24 side of the bush 20, from [sic] the shaft member 11. The bolt 10 is rotated by a tool such as a hexagonal wrench, and the male screw 12 of the bolt 10 is mated into the female screw 32 of the female screw member 31 of the nut body 30. When the lower surface of the bolt head member 14 of the bolt 10 comes in contact with the upper surface of the flange recess portion 25 of the bush 20, it becomes impossible to further screw the bolt 10. In this way, the assembly of the bolt 10, the bush 20 and the nut body 30 is referred to as blind nut assembly 1a.

FIG. 11 is a front view showing a portion of a state in which the mounted member 41 and the mounting member 42 are fastened by the blind nut assembly 1a as a cross section. In FIG. 11, the outer diameter of the nut head member 35 is larger than the inner diameter of the mounting hole 43 of the mounted member 41.

In order to fasten the mounted member 41 and the mounting member 42 by the blind nut assembly 1a, the mounting hole 43 of the mounted member 41 and the mounting hole 44 of the mounting member 42 are aligned, and the blind nut assembly 1a is inserted into the mounting holes 43, 44 with the female screw member 31 of the nut body 30 as the head. The lower surface of the flange 24 contacts the outer peripheral portion of the mounting hole 44 of the mounting member 42.

The hexagonal portion of the flange 24 of the bush 20 is pressed with a tool such as a spanner so as not to be rotated, the tip end of a tool (not shown in the figure), such as a hexagonal wrench, is engaged with the bolt head hole 15 of the bolt 10, and the male screw 12 of the bolt 10 is further mated with the female screw 32 of the nut body 30 when rotated. Since the female screw 32 is pulled upward, the nut cylindrical member 33 is compressed in the vertical direction and buckled, and the enlarged diameter member 33 $d$ is formed.

At this time, since the nut cylindrical member 33 is supported from the inside by the collar 21 of the bush 20, the nut cylindrical member 33 does not deform inward does not abnormally deform in the circumferential direction, normally expands to the outside, and the enlarged diameter member 33$d$ is formed.

When the bolt 10 is tightened until a predetermined fastening torque is reached, the mounted member 41 and the mounting member 42 are sandwiched between the lower surface of the flange 24 and the enlarged diameter member 33$d$, and the fastening is completed. In this way, the mounted member 41 and the mounting member 42 are fastened by the blind nut assembly 1a.

A method of removing the blind nut assembly 1a from the mounted member 41 and the mounting member 42 will now be described. The hexagonal portion of the flange 24 of the bush 20 is pressed with a tool such as a spanner, and the tip of a tool such as a hexagonal wrench is engaged with the bolt head hole 15 of the bolt 10 and is rotated in the reverse direction. When this happens, the male screw 12 of the bolt 10 is unscrewed from the female screw 32 of the nut body 30, and the bolt 10 can be withdrawn upward.

Since the engagement between the bush 20 and the nut body 30 is released, the bush 20 can also be pulled upward. The mounting member 42 can be removed from the nut body 30 and the bush 20. The outer diameter of the nut head member 35 is larger than the inner diameter of the mounting hole 43 of the mounted member 41, and the mounted member 41 is sandwiched between the nut head member 35 and the enlarged diameter member 33$d$. Therefore, the mounted member 41 cannot be removed from the nut body 30.

FIG. 12 is a front view showing a portion of a state in which the mounted member 41 and the mounting member 42 are fastened by a blind nut assembly 1a, similar to FIG. 11. In FIG. 12, the outer diameter of the nut head 35 is smaller than the inner diameter of the mounting hole 43 of the mounted member 41. As in FIG. 11, when the blind nut assembly 1a is removed, the mounting member 42 can be removed. In FIG. 12, the mounted member 41 can also be removed from the nut body 30.

FIGS. 11 and 12 will now be compared. As shown in FIG. 11, if the outer diameter of the nut head member 35 is larger than the inner diameter of the attachment hole 43 of the mounted member 41, although the mounting member 42 can be removed, the mounted member 41 cannot be removed from the nut body 30. As shown in FIG. 12, if the outer diameter of the nut head 35 is smaller than the inner diameter of the mounting hole 43 of the mounted member 41, the mounting member 42 and the mounted member 41 can be removed from the nut body 30.

In the first embodiment, the nut head 35 of the nut body 30 and the polygonal inner surface of the nut cylindrical member 33 engage with the polygonal outer surface of the collar 21 of the bush 20. The nut cylindrical member 33 is supported by the collar 21 so as not to deform inwardly and not to rotate. Therefore, when the nut cylindrical member 33 is buckled to form the enlarged diameter member 33$d$, the nut cylindrical member 33 is not deformed inward, it does not deform in the circumferential direction, and the expanded diameter portion 33$d$ of a certain shape can be molded.

When the bush 20 is made of a hard material that is difficult to deform, the nut cylindrical member 33 is stably supported by the bush 20 when buckling, and the enlarged diameter member 33$d$ can be more reliably formed. Without the portion of the collar 21 of the bush 20, when the nut cylindrical member 33 is buckled, the nut cylindrical member 33 may be deformed inward or in the circumferential direction, and the enlarged diameter member 33$d$ cannot be normally molded.

Figure 13:
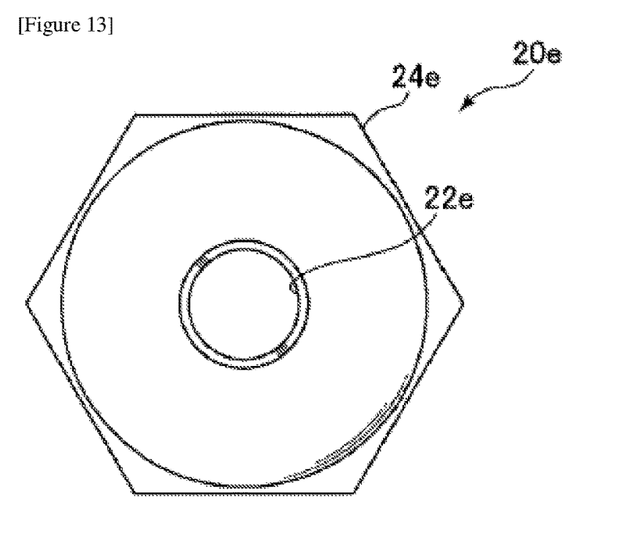
FIG. 13 is a top view of a modification of the bushing.
Figure 14:
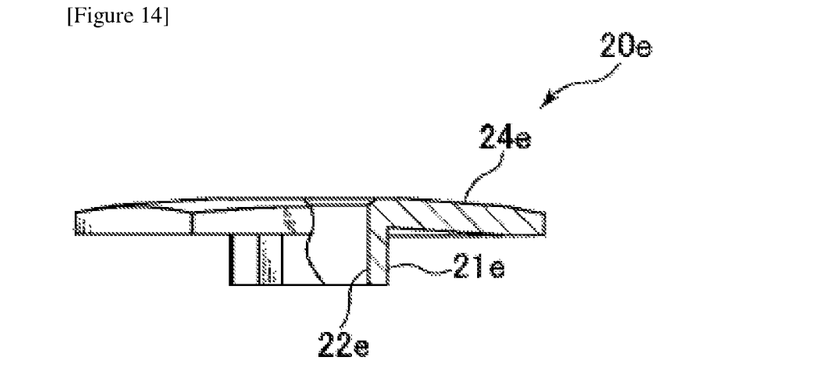
FIG. 14 is a front view showing a portion of a modification of the bush of FIG. 13 as a cross section.
Figure 15:
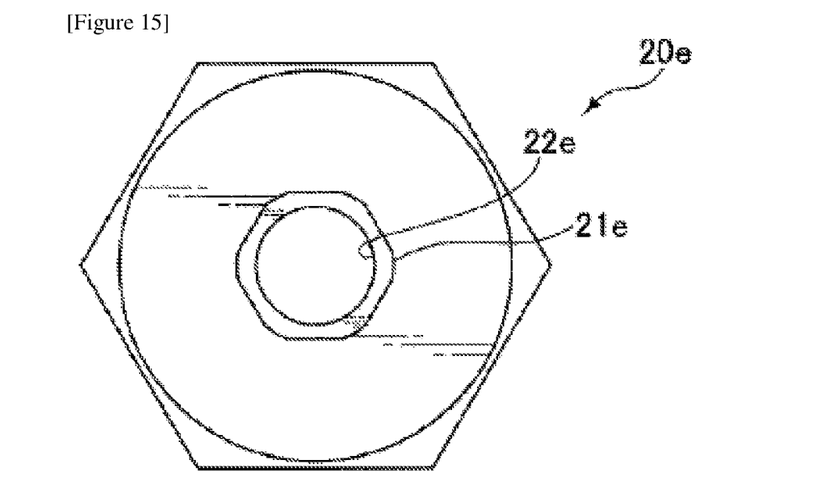
FIG. 15 is a bottom view of a modification of the bush of FIG. 13.

An example of a modification to the bush will now be described with reference to FIGS. 13-15. For an example of a modification to the bushing, "e" is added to the reference number representing the parts of the bush 20. FIG. 13 is a top view of the bush 20$e$, FIG. 14 is a front view in which a part is cross-sectioned, and FIG. 15 is a bottom view. With the bush 20$e$, the plate thickness of the flange 24$e$ is thinner than the bush 20, and the upper surface and the lower surface of the flange 24$e$ are inclined downward in the radial direction outward. No flange recess is formed on the upper surface of the flange 24$e$. The collar 21$e$ is the same as the collar 21.

The bush 20$e$ is used in place of the bush 20 of the first embodiment. That is, the bush 20$e$, the bolt 10 of the first embodiment and the nut body 30 are combined, and the male screw 12 of the bolt 10 is mated into the female screw 32 of the nut body 30 to form the blind nut assembly 1$e$. The mounted member 41 and the mounting member 42 are fastened by the blind nut assembly 1$e$ using the modified bush 20$e$. When the blind nut assembly 1$e$ is inserted into the mounting holes 43, 44 of the mounted member 41 and the mounting member 42, the outer peripheral portion of the flange 24$e$ abuts the upper surface of the mounting member 42. As the bolt 10 is screwed in, the nut cylindrical member 33 buckles to form the enlarged diameter member 33$d$. At this time, the flange 24$e$ is deflected, and the entire lower surface of the flange 24$e$ comes into contact with the upper surface of the mounting member 42. By using the bush 20$e$, a stable axial force can be obtained even after fastening by the spring action of the flange 24$e$.

Second Embodiment

Figure 16:
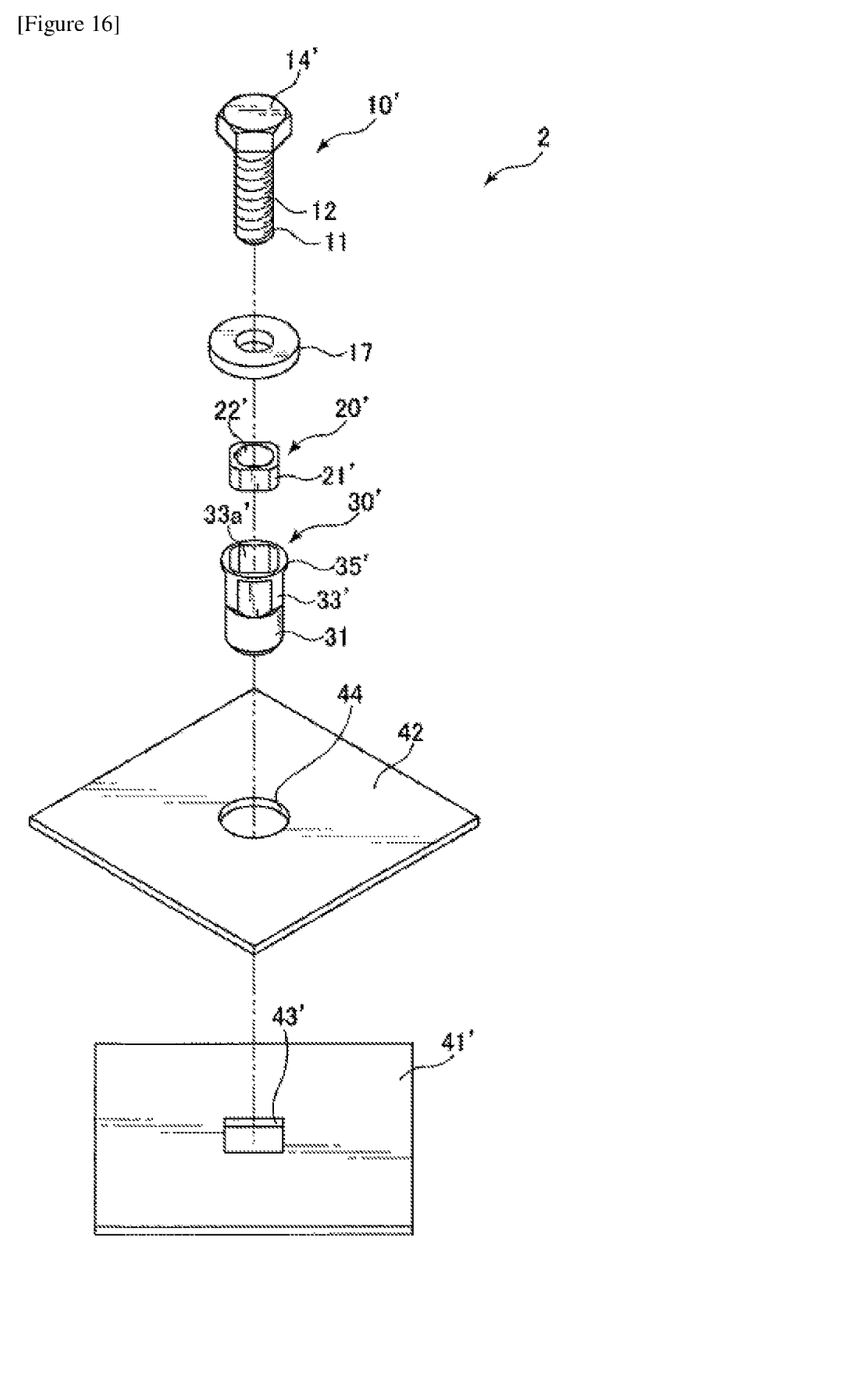
FIG. 16 is an exploded perspective view of a blind nut according to a second embodiment of the present invention.

Next, a blind nut 2 according to a second embodiment of the present invention will be described. Regarding the blind nut 2, mainly the aspects that are different from the blind nut 1 will be described. The same portions as those of the first embodiment are denoted by the same reference numerals. These correspond to the reference numerals of the first embodiment; however, for parts that are different, the reference numerals of the first embodiment will be described with (') [prime] added. FIG. 16 is an exploded perspective view of the blind nut 2, the commercially-available bolt 11, the commercially-available washer 17, the mounted member 41', and the mounting member 42 according to the second embodiment. The blind nut 2 includes a bush 20' and a nut body 30'.

Referring to FIG. 16, the bolt 10' has a shank 11 having a male screw 12 and a bolt head 14' on the top thereof. The bolt head 14' has a hexagonal cross section shape and can be rotated by a tool, such as a commercially-available spanner. As in the first embodiment, the bolt head 14' may form a hexagonal bolt head hole, and it can rotate by inserting a tool such as a hexagonal wrench into the bolt head hole.

The washer 17 is a commercially-available product with a short cylindrical shape; its upper and lower surfaces are flat, and a through hole is formed in the center. The inner diameter of the center hole of the washer 17 is larger than the outer diameter of the shaft member 11 of the bolt 10' and smaller than the distance between the hexagonal opposing sides of the bolt head member 14'. When the bolt head 14' has the same function as the washer 17, the washer 17 may be omitted.

Figure 17:
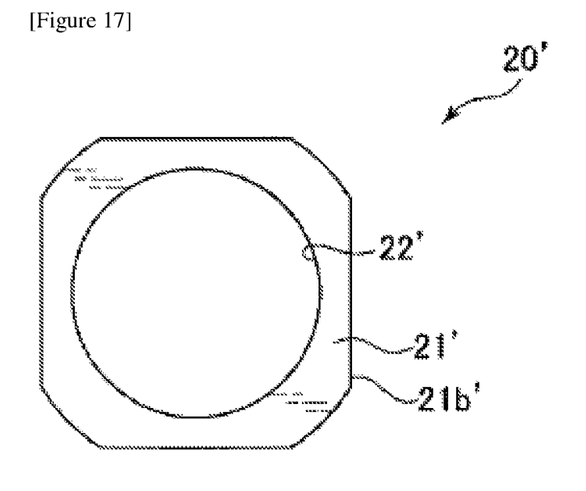
FIG. 17 is a top view of the collar of the blind nut of FIG. 16.
Figure 18:
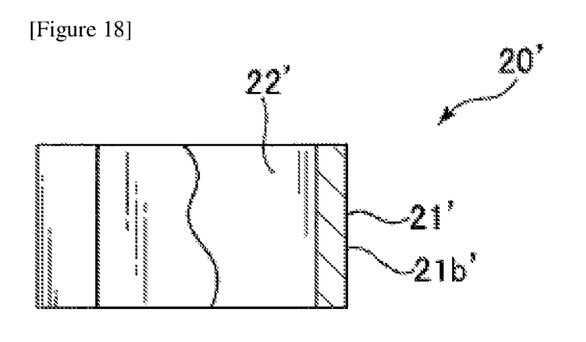
FIG. 18 is a front view showing a portion of the collar of FIG. 17 as a cross section.

FIG. 17 is a top view of the collar 21' of the blind nut 2, and FIG. 18 is a front view showing a portion of the collar 21' as a cross section. The bush 20' is a short cylindrical collar 21'. Although there is no flange portion, it is referred to as a bush 20' for matching with the part name of the first embodiment. In other words, the bush 20' consists of only the collar 21'. The outer surface of the collar 21' is a polygonal outer surface having a substantially rectangular cross section, and the corner portion is chamfered. A collar hole 22' having a circular cross section is formed on the collar 21'. The collar 21' and the nut cylindrical member 33' do not rotate relative to each other.

Figure 19:
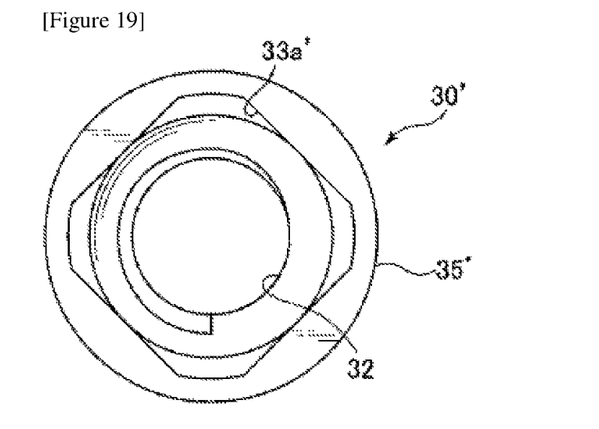
FIG. 19 is a top view of the nut body of the blind nut of FIG. 16.
Figure 20:
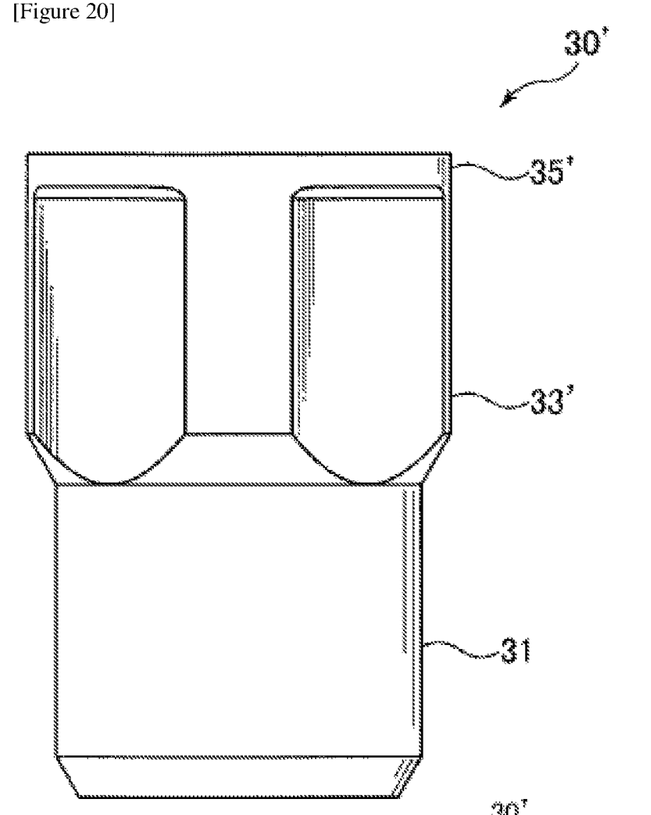
FIG. 20 is a front view of the nut body of FIG. 19.
Figure 21:
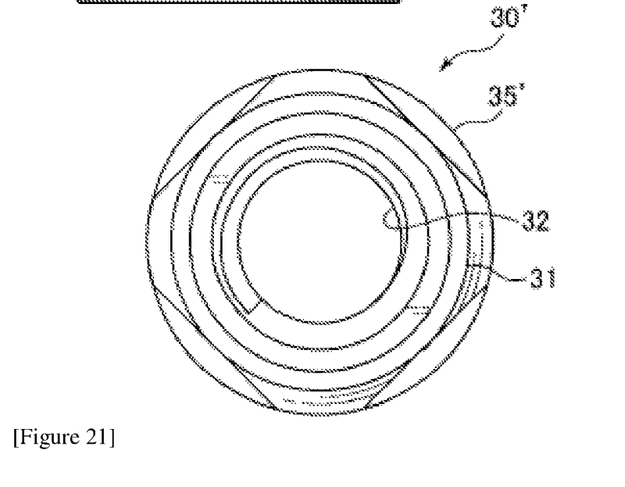
FIG. 21 is a bottom view of the nut body of FIG. 19.

FIG. 19 is a top view of the nut body 30', FIG. 20 is a front view of the nut body 30', and FIG. 21 is a bottom view of the nut body 30'. The nut body 30' has a female screw member 31 and a nut cylindrical member 33' above that; a nut head member 35' is formed on the upper end portion of the nut cylindrical member 33'. The female screwed portion 31 is cylindrical, and a female screw 32 is formed on the inner surface. The female screw 32 can be mated into the male screw 12 of the bolt 10'.

A nut cylindrical member 33' is formed on the upper side of the female screw 32. The nut outer surface 33b' of the nut cylindrical member 33' is a polygonal outer surface having a substantially quadrangular cross section, and the corner portion is chamfered. A portion of the nut cylindrical member 33' buckles and expands in diameter.

The nut inner surface 33a' of the nut cylindrical member 33' is a polygonal inner surface which is larger than the inner diameter of the female screw member 31; it has a substantially quadrangular section, and the corner portion is chamfered. The nut inner surface 33a' is matched with the collar outer surface 21b' of the bush 20'. The nut inner surface 33a' is slightly smaller than the collar outer surface 21b' so that the collar 21' can be inserted into the nut cylindrical member 33' of the nut body 30' by pushing it. When the collar 21' is pushed into the nut cylindrical member 33', the upper surface of the collar 21' is almost flush with the upper surface of the nut head member 35'. The nut cylindrical member 33' is supported from the inside by the collar 21'.

A short nut head member 35' is formed on the upper side of the nut cylindrical member 33'. The cross section of the inner surface of the nut head member 35' is the same as the nut cylindrical member 33' and is substantially square. The cross section of the outer surface of the nut head member 35' is circular and is equal to the maximum diameter (the distance between the apexes of the quadrangle) of the nut cylindrical member 33'.

The thickness of the nut head member 35' is thicker than the thickness of the nut cylindrical member 33'. Even when the nut cylindrical member 33' buckles and expands its diameter, the nut head member 35' at the distal end portion will not be deformed. The collar 21' protects the upper portion of the nut cylindrical member 33' from the inside when the nut cylindrical member 33' buckles and expands its diameter.

A rectangular mounting hole 43' is formed in the mounted member 41'. A circular mounting hole 44 is formed in the mounting member 42. Alternatively, the mounting hole 44 of the mounting member 42 may also be formed in a square shape. When the nut cylindrical member 33' having a substantially rectangular cross section is inserted into the rectangular mounting hole 43', the nut cylindrical member 33' is held so as not to rotate with respect to the mounting hole 43'. Therefore, when buckling the nut cylindrical member 33', there is no need to stop the rotation with the bush 20'. Since it is not necessary to hold the bush 20' against rotation, the bush 20' is not provided with a polygonal flange on the outer surface.

The bolt 10', the washer 17, the bush 20' and the nut body 30' are combined to form a blind nut assembly 2a. The bush 20' is inserted into the nut body 30'. The collar hole 22' and the hole of the washer 17 are aligned thereon, and the washer 17 is placed. The bolt 10' is inserted from the hole of the washer 17, and the male screw 12 of the bolt 10' is engaged with the female screw 32 of the nut body 30' to form the blind nut assembly 2a.

The blind nut assembly 2a is used to tighten the mounted member 41' and the mounting member 42. The position of the mounting hole 44 of the mounting member 42 is aligned with the position of the mounting hole 43' of the mounted member 41', and the blind nut assembly 2a is inserted. The blind nut assembly 2a is rotationally stopped by a rectangular mounting hole 43'. When the bolt 10' is tightened using a tool such as a spanner, the nut cylindrical member 33' buckles and expands in diameter to form an enlarged diameter member 33d', and the mounted member 41' and the mounting member 42 are tightened between the lower surface of the washer 17 and the enlarged diameter member 33d'.

In order to remove the blind nut assembly 2a from the mounted member 41' and the mounting member 42, by rotation of the bolt 10' in the reverse direction with a tool, the screwing between the male screw 12 of the bolt 10' and the female screw 32 of the nut body 30' is released.

In the second embodiment, the shape of the mounting hole 43' of the mounted member 41' is a polygon conforming to the shape of the nut cylindrical member 33' of the nut body 30'. Since the nut body 30' is rotationally stopped by the mounting hole 43', there is no need to stop the rotation by the bush 20'. Therefore, the bush 20' has a simple shape of only the collar 21'. Since the lower surface of the bolt head 14' directly contacts the upper surface of the nut head member 35' of the nut body 30', it is better to use the washer 17.

Also in the second embodiment, the nut head member 35' and the nut cylindrical member 33' of the nut body 30' are reinforced by the collar 21' from the inside. Therefore, when the nut cylindrical member 33' is buckled to form the enlarged diameter member 33d', abnormal deformation does not occur, and the enlarged diameter member 33d' can form a certain shape.

The invention claimed is:

1. Blind nut, comprising a bush consisting of a short cylindrical collar, which has a polygonal outer surface on the outer surface thereof, and a flange, which is formed on one end of the collar; and a nut body consisting of a cylindrical female screw member, on which a female screw to be mated with a male screw on a bolt is formed; and a nut cylindrical member, which is formed adjacent to the female screw member, which has a polygonal inner surface on the inner surface thereof aligning with the polygonal outer surface of the collar, and which has a wall thickness that is thinner than the female screw member.

2. The blind nut of claim 1, wherein a nut head member having an outer diameter larger than the outer diameter of the nut cylindrical member is formed on the end of the nut cylindrical member.

3. The blind nut of claim 1, wherein the outer surface of the flange of the bush is polygonal.

4. The blind nut of claim 1, wherein the outer surface of the nut cylindrical member is a polygonal outer surface having the same number of polygonal corners as the polygonal inner surface of the nut cylindrical member; and the plate thickness of the nut cylindrical member is constant in the circumferential direction.

5. The blind nut of claim 1, wherein the bush is formed with a material which is harder than the nut body.

6. The blind nut assembly of claim 1, which is an assembly of the blind nut and the bolt,
wherein the lower surface of the bolt head of the bolt is in contact with the upper surface of the flange of the bush, the lower surface of the flange of the bush is in contact with the upper surface of the nut cylindrical portion of the nut body, the polygonal outer surface of the collar of the bush aligns with the polygonal inner surface of the nut cylindrical member of the nut, the collar of the bush is accommodated within the nut body so as not to be rotated, and the male screw of the bolt is mated with the female screw of the nut body.

7. The mounting structure of claim 6 for tightening the mounted member and the mounting member by means of the blind nut assembly, wherein the collar of the bush and a portion of the nut cylindrical member of the nut body are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the flange of the bush and the expanded diameter member where the nut cylindrical member of the nut is expanded.

8. A blind nut comprising a bush consisting of a short cylindrical collar, which has a polygonal outer surface on the outer surface thereof; and a nut body, consisting of a cylindrical female screw member, on which a female screw to be mated with a male screw on the axial member of a bolt is formed, and a nut cylindrical member, which is formed adjacent to the female screw member, which has a polygonal inner surface on the inner surface thereof aligning with the polygonal outer surface of the collar, of which the outer surface is a polygonal outer surface thereof, having the same number of polygonal corners as the polygonal inner surface, and which has a wall thickness that is thinner than the female screw member.

9. The blind nut of claim 8, wherein a nut head member, of which the outer diameter is larger than the outer diameter of the nut cylindrical member, is formed on the end of the nut cylindrical member.

10. The blind nut assembly of claim 8, which is an assembly of the blind nut and the bolt;
wherein the polygonal outer surface of the collar aligns with the polygonal inner surface of the nut cylindrical member of the nut body, the collar is accommodated within the nut so as not to be rotated, the lower surface of the bolt head member of the bolt is in contact with the upper surface of the nut cylindrical member of the nut body, and the male screw of the axis member of the bolt is engaged with the female screw of the nut body.

11. The mounting structure of claim 10 for tightening the mounted member and the mounting member by means of the blind nut assembly, wherein the collar, and a portion of the nut cylindrical member of the nut body are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the bolt head of the bolt and the expanded diameter member where the nut cylindrical member of the nut is expanded.

12. Blind nut assembly of claim 8 which is an assembly of the blind nut, bolt, and washer through which the bolt passes through, wherein the polygonal outer surface of the collar aligns with the polygonal inner surface of the nut cylindrical member of the nut body, the collar is accommodated within the nut so as not to be rotated, the lower surface of the bolt head member of the bolt is in contact with the upper surface of the washer, the lower surface of washer is in contact with the upper surface of the nut cylindrical member of the nut body, and the male screw of the axis member of the bolt is mated with the female screw of the nut body.

13. The mounting structure of claim 12 for tightening the mounted member and the mounting member by means of the blind nut assembly, wherein the collar and a portion of the nut cylindrical member of the nut body are accommodated within the mounting hole of the mounting member, a portion of the inside of the nut cylindrical member is supported by the collar, and the area surrounding the mounting hole of the mounted member and the area surrounding the mounting hole of the mounting member are sandwiched between the lower surface of the washer and the expanded diameter member where the nut cylindrical member of the nut is expanded.

14. The mounting structure of claim 11, wherein the mounting hole of the mounted member is polygonal, having the same number of polygonal corners as the polygonal outer surface of the collar and the polygonal inner surface of the nut cylindrical member.

15. The mounting structure of claim 14, wherein the mounting hole of the mounted member is square.

* * * * *